(12) United States Patent
Hirukawa et al.

(10) Patent No.: US 7,808,700 B2
(45) Date of Patent: Oct. 5, 2010

(54) CONFOCAL MICROSCOPE SYSTEM

(75) Inventors: Hideo Hirukawa, Musashino (JP); Mikiharu Kuwata, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 343 days.

(21) Appl. No.: 12/052,255

(22) Filed: Mar. 20, 2008

(65) Prior Publication Data

US 2008/0239475 A1 Oct. 2, 2008

(30) Foreign Application Priority Data

Mar. 30, 2007 (JP) ............................. 2007-090836

(51) Int. Cl.
*G02B 21/06* (2006.01)
(52) U.S. Cl. ...................................... 359/388
(58) Field of Classification Search ................. 359/234, 359/385, 388
See application file for complete search history.

(56) References Cited

U.S. PATENT DOCUMENTS

| | | | |
|---|---|---|---|
| 6,404,545 B1 * | 6/2002 | Ishiwata ..................... 359/371 |
| 6,426,835 B1 * | 7/2002 | Endo et al. ................... 359/388 |
| 6,934,079 B2 * | 8/2005 | Hell et al. .................... 359/368 |
| 6,940,625 B2 * | 9/2005 | Endo et al. ................... 359/234 |
| 7,190,514 B2 * | 3/2007 | Mikuriya et al. ............ 359/385 |
| RE39,751 E * | 7/2007 | Kitagawa ..................... 359/385 |
| 7,586,674 B2 * | 9/2009 | O'Connell ................... 359/368 |
| 7,643,209 B2 * | 1/2010 | Fukuyama ................... 359/381 |

FOREIGN PATENT DOCUMENTS

JP 2570631 U 5/1998

* cited by examiner

*Primary Examiner*—Frank G Font
(74) *Attorney, Agent, or Firm*—Westerman, Hattori, Daniels & Adrian, LLP

(57) ABSTRACT

A confocal microscope system capable of observing a bright field image and a fluorescent image together with a confocal image can be achieved with a simple configuration. The confocal microscope system may include a confocal scanner unit having a microlens array disc and a pin hole array disc, for scanning a face of the observation sample by a plurality of beam spots, a relay lens connected to a camera for acquiring observed images; a microscope for holding the observation sample and illuminating an observation light for observing the bright field image and an excitation light for observing the fluorescent image on the observation sample, and having a port part for outputting the observation light acquired from the observation sample to the confocal scanner unit; and a detour light path unit selectively inserted between the port part of the microscope and the confocal scanner unit.

5 Claims, 7 Drawing Sheets

FIIG. 4

CONFOCAL MICROSCOPE SYSTEM

FIELD OF THE INVENTION

The invention relates to a confocal microscope system using a spinning pin hole array disc, and in particular, to a confocal microscope system capable of observing a bright field image and a fluorescent image together with a confocal image.

BACKGROUND OF THE INVENTION

There has been conventionally well known a confocal microscope system using a pin hole array disc (Nipkow disc) type confocal scanner. FIG. 7 is a view showing a configuration of an example of the conventional confocal microscope system. In FIG. 7, a confocal scanner unit 1 is attached to a port part 3 of an inverted microscope 2. A tube lens 3a is provided inside the port part 3.

Attached to the microscope 2 are an observation light source 4 for emitting an observation light for observing a bright field image, an excitation light source 5 for emitting an excitation light for observing a fluorescent image, a condenser lens 6, an objective lens 7, an imaging camera 8, an ocular lens 9 and a sample table 11 on which an observation sample 10 is placed.

A mirror part 12 is configured to be able to select a total reflection mirror or a through state. Further, a mirror part 13 is configured to be able to select a dichroic mirror which transmits an excitation light and reflects a fluorescent image from the observation sample 10, or a total reflection mirror. The selection of the mirrors is executed by arranging the dichroic mirror and the total reflection mirror at the same angle on a linear movement mechanism and sliding them. A mirror part 14 is configured to be able to select a total reflection mirror, a half mirror or a through state. Other mirrors 15, 16, 17 are all total reflection mirrors.

Attached to the confocal scanner unit 1 are a laser light source 19 for emitting a laser light (excitation light) via an optical fiber 18 and an imaging camera 20 for acquiring a confocal image. A microlens array disc 21 and a pin hole array disc 22 are provided inside the confocal scanner unit 1 wherein they are configured to be connected to each other by a bearing part 23 and rotated at the same time by a motor 24.

A dichroic mirror 25 is disposed midway between the microlens array disc 21 and the pin hole array disc 22 for transmitting the laser light (excitation light) from the laser light source 19 and reflecting the fluorescent image from the observation sample 10, and also total reflection mirrors 26, 27 and 28 are disposed as shown in FIG. 7.

A collimate lens 29 for converting the light emitted from the tip end of the optical fiber 18 into a parallel light, and a set of relay lenses 30, 31 for focusing the observed image on the imaging camera 20 are disposed, respectively, as shown in FIG. 7.

The light from the observation light source 4 illuminates the observation sample 10 via the mirror 16 and the condenser lens 6 while the bright field image from the observation sample 10 is transmitted through the mirror part 12 in the through state, and is reflected by the selected mirror part 13 by which the total reflection mirror is selected.

When observing a reflected bright field image with naked eyes, the total reflection mirror is selected by the mirror part 14 to cause the bright field image to be guided to the ocular lens 9, so that the observation with naked eyes can be executed.

In the case where the bright field image is acquired by the imaging camera 8, the mirror part 14 is caused to be in the through state so that the bright field image is focused via an imaging lens on the imaging camera 8. Further, when the mirror part 14 is caused to be a half mirror, a visual observation and an observation by the imaging camera 8 can be executed at the same time.

When observing the fluorescent light, the mirror part 13 selects the dichroic mirror, and the mirror part 12 is caused to be in the through state. Accordingly, the excitation light from the excitation light source 5 is reflected by the mirror 17, and transmits the mirror part 13 which is set as a dichroic mirror and the mirror part 12, subsequently illuminated on the observation sample 10 via the objective lens 7.

The fluorescent light emitted from the observation sample 10 is returned to the same light path, but it is reflected by the mirror part 13 which is set as a dichroic mirror. Accordingly, the fluorescent image passes through a barrier filter, not shown, then it is guided to the ocular lens 9 and the imaging camera 8, by the same method described as above, where the observation by naked eyes and acquiring are executed.

When acquiring the confocal image, the observation light source 4 of the microscope 2 and the excitation light source 5 are turned off to cause the mirror part 12 to be in a state of the total reflection mirror. The laser light from the laser light source 19 is converted into a parallel light by the collimate lens 29, which is subsequently reflected by the mirrors 28, 27 and directed to the microlens array disc 21.

The laser light is condensed as a plurality of beam spots by individual microlenses of the microlens array disc 21. The condensing light is transmitted through the dichroic mirror 25 and condensed on corresponding individual pin holes of the pin hole array disc 22. The light passed through the pin holes is converted into a parallel light by a tube lens 3a inside the port part 3, which is subsequently reflected by the mirror 12 and is illuminated on the observation sample 10 via the objective lens 7.

The fluorescent image from the observation sample 10 is returned to the same light path, and passes again through the individual pin holes, which is subsequently reflected by the dichroic mirror 25, and it is imaged on imaging elements of the imaging camera 20 via the mirror 26, and the relay lenses 30, 31.

When the microlens array disc 21 and the pin hole array disc 22 are rotated at high speed, individual beam spots over the observation sample 10 scan the focal plane on the observation sample, whereby the fluorescent light from the focal plane of the observation sample also scans on the imaging elements. The light other than the light emitted on the focal plane can not pass through the same light path, and hardly passes through the pin holes. As a result, the fluorescent image (confocal image) from the focal plane is acquired by the imaging camera 20.

There is the following patent document for observing a confocal image and a fluorescent image by a common observation part.

[Patent Document 1] Japanese Utility Model Registration No. 2570631

However, according to the confocal microscope system having the configuration shown in FIG. 7, in order to acquire a usual microscopic image such as the bright field image and the fluorescent image, and the confocal image by a camera, two imaging cameras are required, or one camera need be replaceably mounted on the system when observing respective images. Accordingly, when two expensive high sensitivity cameras are mounted on the confocal microscope system, there is a problem that the system becomes expensive. Further, if one camera is used while replaceably mounted on the system, there is a problem that replacement of the camera is troublesome and not practical. Further, when the normal microscopic image is caused to be transmitted through the confocal scanner unit to be acquired by then imaging camera, the light is merely transmitted through the pin hole array disc by an aperture ratio thereof, thereby causing the image to be dark in lightness to a degree of two digits.

Further, the device disclosed in the patent document 1 described as above is not provided for observing a bright field image, and also an excitation light for observing the fluorescent image is illuminated on the observation sample via a confocal scanner so that the fluorescent image becomes a half confocal image.

SUMMARY OF THE INVENTION

The invention has been developed to eliminate the drawbacks of the conventional system, and it is an object of the invention to achieve a confocal microscope system capable of observing a bright field image and a fluorescent image together with a confocal image with a simple configuration.

A confocal microscope system according to the invention, for observing a bright field image, a fluorescent image, a confocal image acquired from an observation sample, is characterized in comprising: a confocal scanner unit having at least a microlens array disc and a pin hole array disc, for scanning a face of the observation sample by a plurality of beam spots, and a relay lens connected to a camera for acquiring observed images; a microscope for holding the observation sample and illuminating an observation light for observing the bright field image and an, excitation light for observing the fluorescent image on the observation sample, and having a port part for outputting the observation light acquired from the observation sample to the confocal scanner unit; and a detour light path unit selectively inserted between the port part of the microscope and the confocal scanner unit for branching the observation light from the observation sample and guiding the branched observation light to the relay lens in the confocal scanner unit.

The confocal microscope system according to the invention is characterized in that the microscope has an observation light source to emit the observation light for observing the bright field image, and an excitation light source to emit the excitation light for observing the fluorescent image, while the confocal scanner unit has a laser light source for observing the confocal image.

The confocal microscope system according to the invention is characterized in that the relay lens in the confocal scanner unit is connected to a camera for acquiring the observed image.

The confocal microscope system according to the invention is characterized in that the detour light path unit comprises branching means to be inserted between the port part of the microscope and the confocal scanner unit and configured by a half mirror or a dichroic mirror, and laser superposition means to focus a laser light for observing a discolored fluorescent light on the observation sample in a light path thereof.

The confocal microscope system according to the invention is characterized in further comprising a laser light introduction unit for introducing the laser light into the laser superposition means provided with operation means for causing the laser light to scan the observation sample.

According to the confocal microscope system of the invention, the bright field image and the fluorescent image can be observed together with the confocal image by the common relay lens and imaging camera. In other words, the bright field image, the fluorescent image, and the confocal image acquired from the observation sample are respectively acquired with ease by one imaging camera. Further, since the port part of the microscope and the camera can be disposed coaxially, it is possible to provide a strong system relative to the displacement of the light axis. Further, since the number of mirrors to reflect lights become an even number in both cases of acquiring the confocal image and the microscopic image by disposing the port part of the microscope and the camera coaxially, there is an advantage of not forming a mirror image.

BEST MODE FOR CARRYING OUT THE INVENTION

An embodiment of the confocal microscope system according to the invention is now described with reference to the accompanying drawings.

Figure 1:
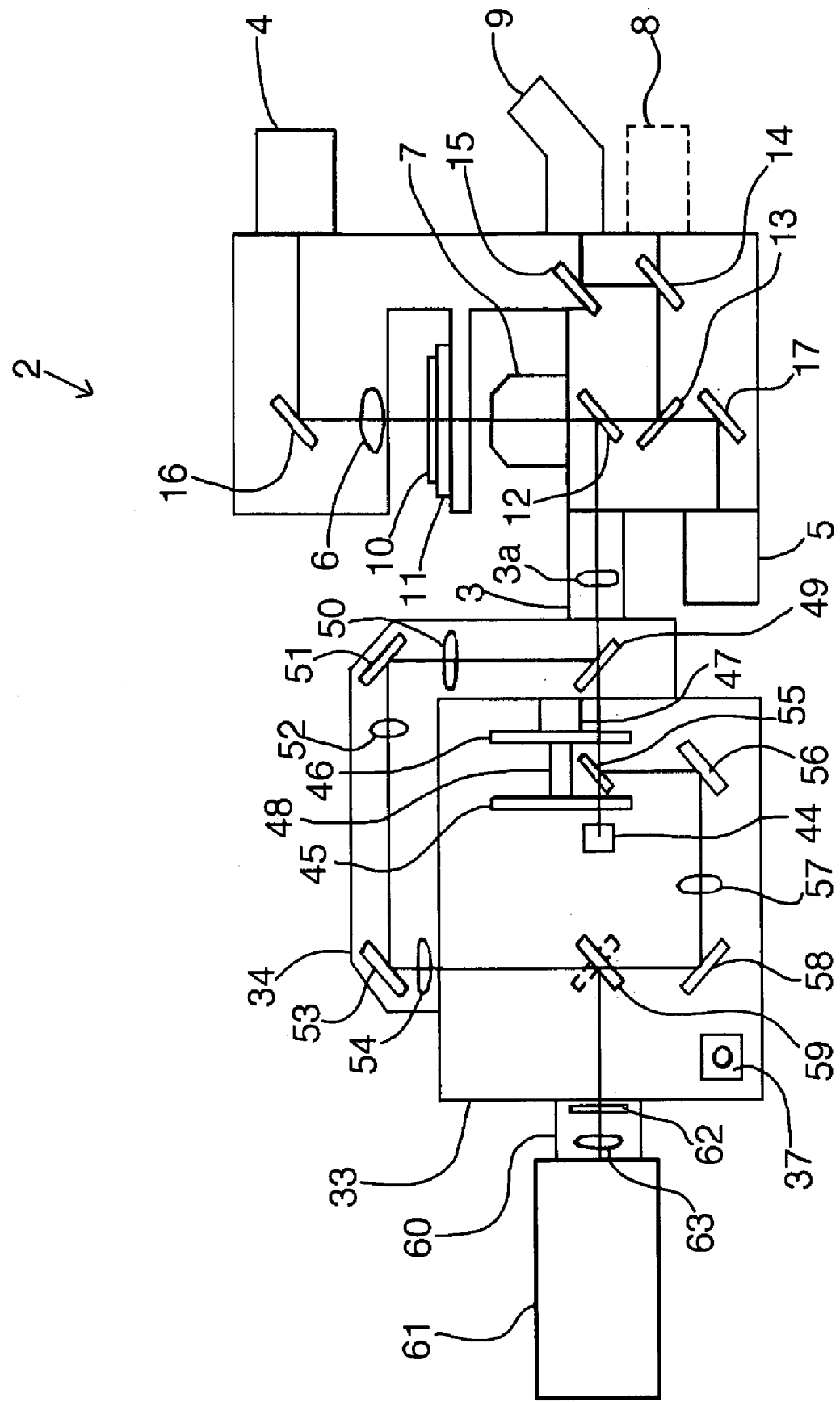
FIG. 1 is a view showing a configuration of an embodiment of a confocal microscope system according to the invention.
Figure 2:
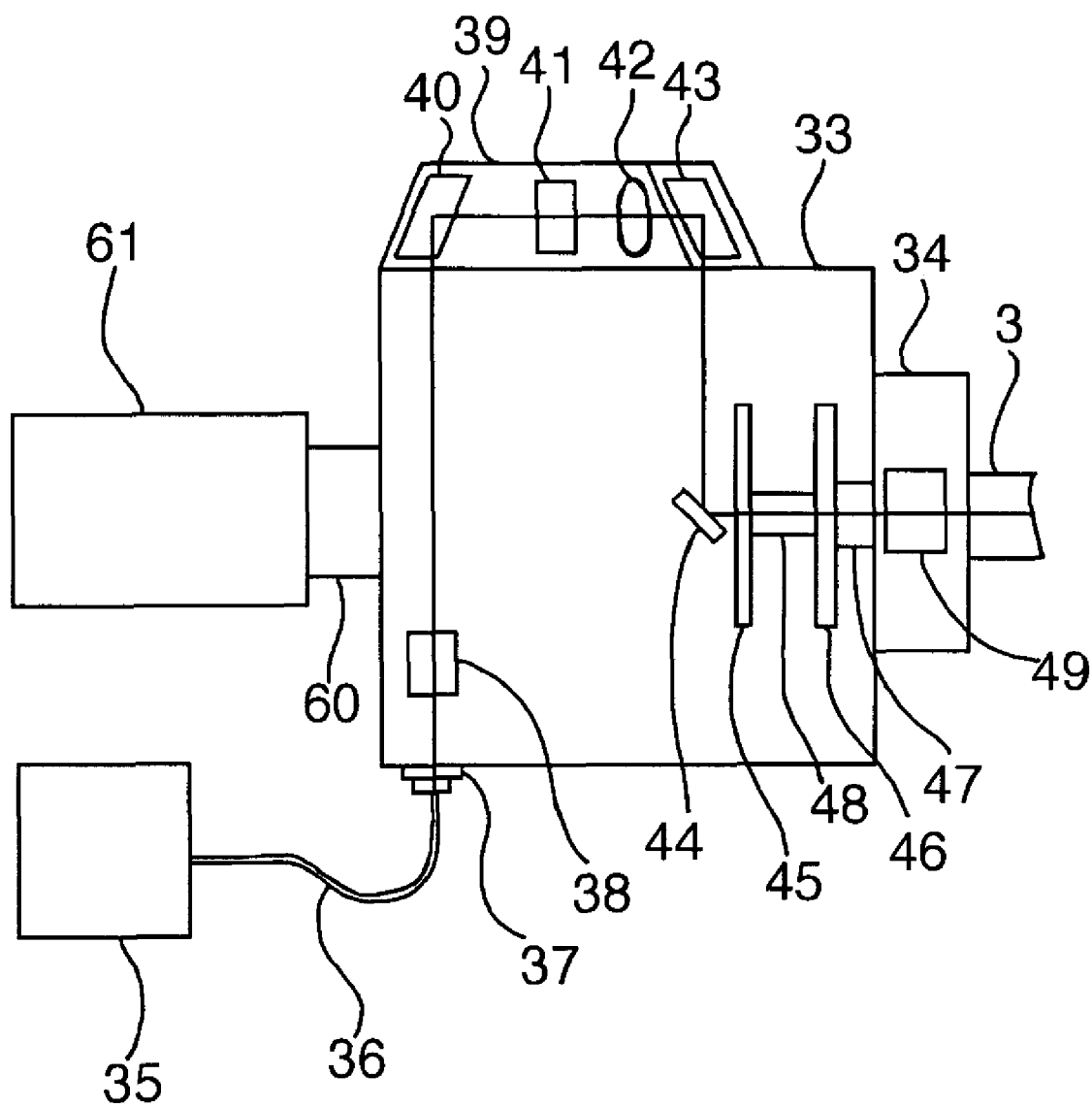
FIG. 2 is a schematic view for explaining an excitation light path of the confocal microscope system in FIG. 1 as viewed from a plan face side.
Figure 3:
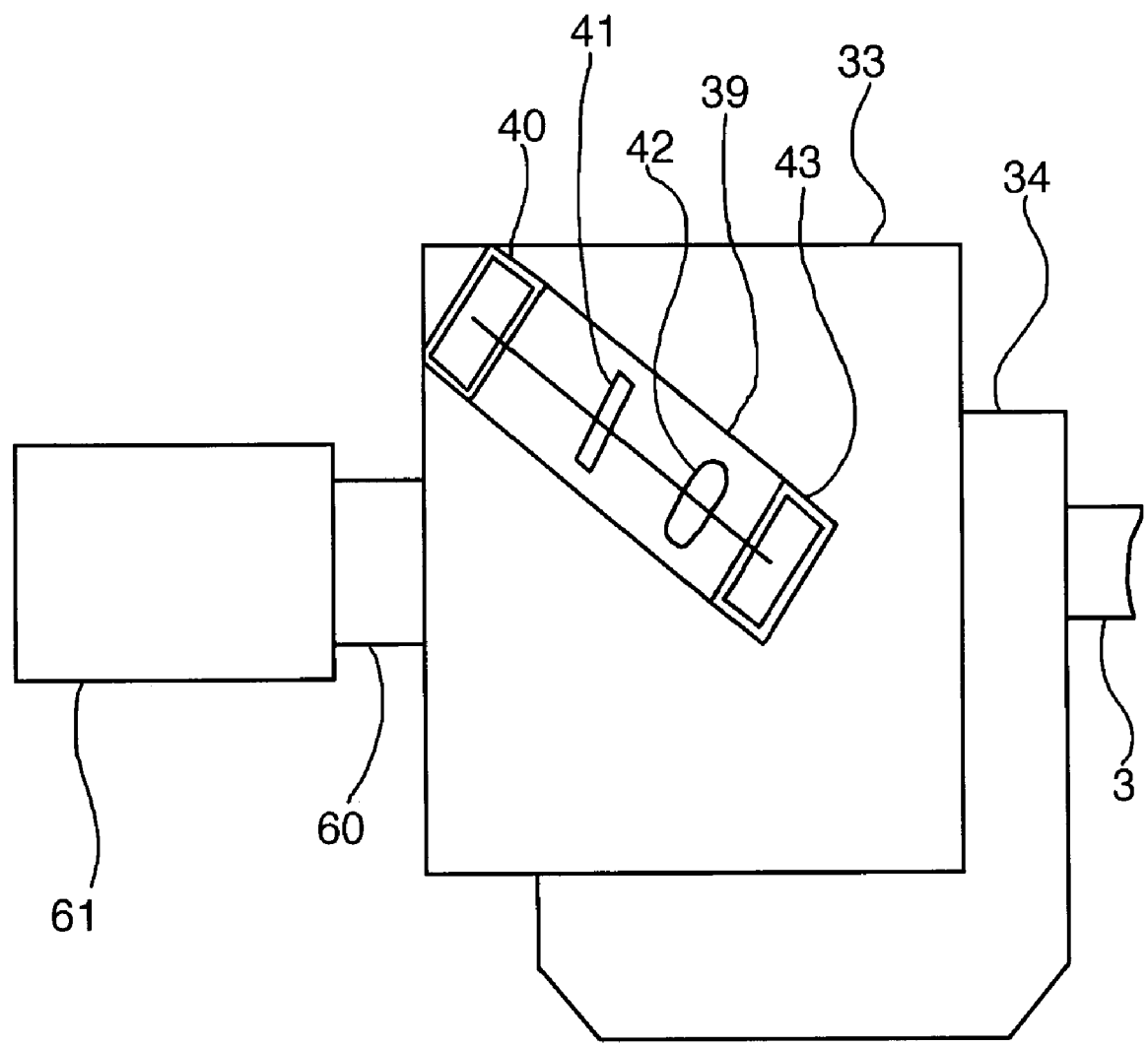
FIG. 3 is a schematic view for explaining an excitation light path of the confocal microscope system in FIG. 1 as viewed from a back face side.
Figure 7:
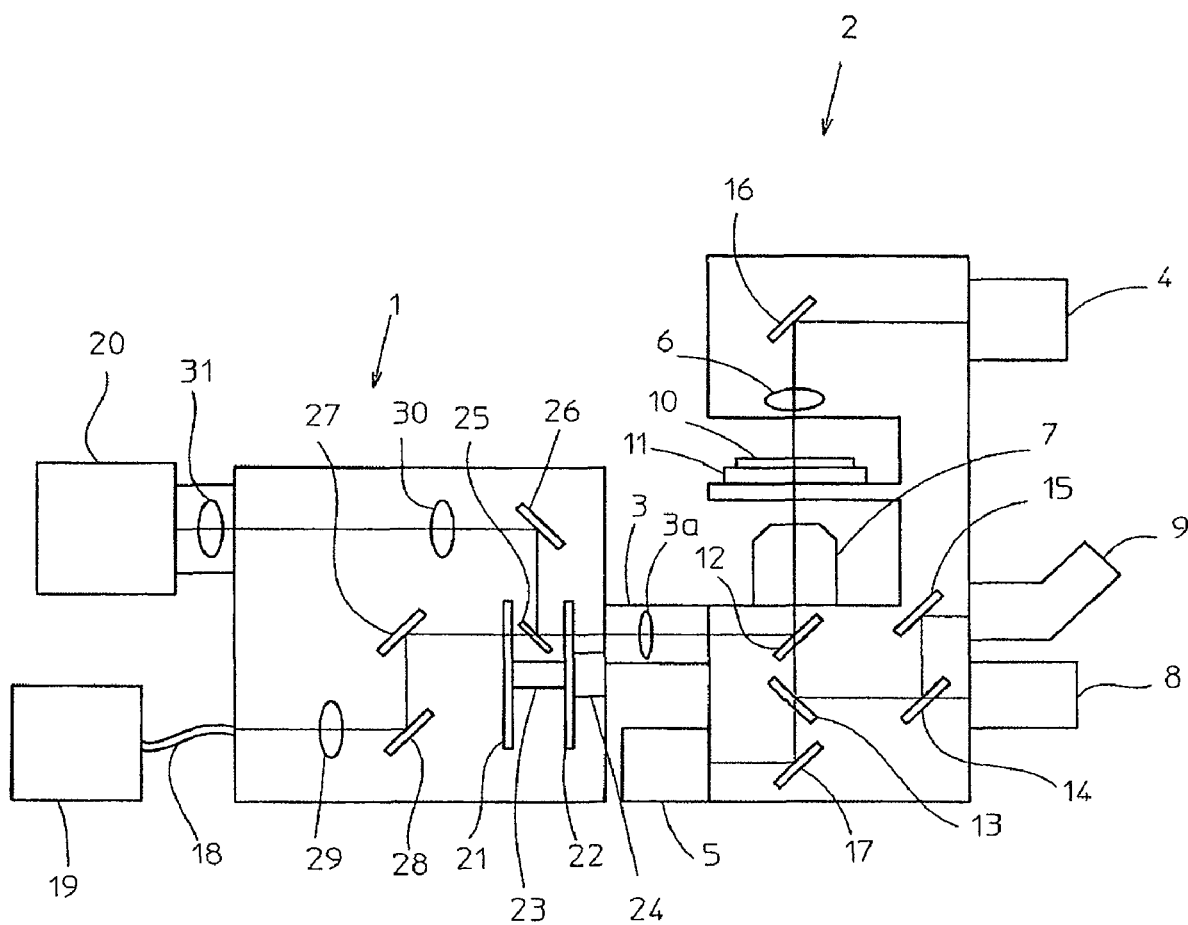
FIG. 7 is a view showing a configuration of an example of a conventional confocal microscope system.

FIG. 1 is a view showing a configuration of a confocal microscope system according to an embodiment of the invention. In the same figure, the components which are the same as those in FIG. 7 are denoted by the same reference numerals. FIG. 2 and FIG. 3 are schematic explanation views (plan face side and rear face side) showing a disposing state of an excitation light path of the confocal microscope system in FIG. 1.

In FIG. 1 to FIG. 3, a confocal scanner unit 33 is attached to a port part 3 of a microscope 2 via a detour light path unit 34. A tube lens 3a is provided inside the port part 3. Attached to the microscope 2 are an observation light source 4, an excitation light source 5, a condenser lens 6, and an objective lens 7, an ocular lens 9 and a sample table 11 on which an observation sample 10 is placed. According to the present embodiment, an imaging camera 8 is not used.

A mirror part 12 is configured to be able to select a total reflection mirror or a through state. Further, a mirror part 13 is configured to be able to select a dichroic mirror which transmits an excitation light and reflects a fluorescent image from the observation sample 10, or the total reflection mirror. Still further, a mirror part 14 is configured to be able to select a total reflection mirror, a half mirror or a through state. Other mirrors 15, 16, 17 are all total reflection mirrors.

A laser light source 35 for emitting a laser light (excitation light) is connected to a fiber connector 37 of the confocal scanner unit 33 via an optical fiber 36. A uniform optical system 38 for uniformizing the laser's Gaussian beam profile is disposed after the fiber connector 37.

Further, an introduction optical system 39 for introducing an excitation light is provided in the confocal scanner unit 33, and a mirror 40, an excitation light filter 41, a collimate lens 42 and a mirror 43 are disposed in the introduction optical system 39 as shown in FIG. 2 and FIG. 3. These components of the introduction optical system 39 are positioned at the rear side of the confocal scanner unit 33 shown in FIG. 1.

A mirror 44 is provided in the confocal scanner unit 33 for reflecting the light from the introduction optical system 39 toward a microlens array disc 45. The microlens array disc 45 and a pin hole array disc 46 are supported by a bearing 48 so as to confront each other, and they are configured to be rotatable by a motor 47.

A dichroic mirror 55 is provided between the microlens array disc 45 and the pin hole array disc 46. Further, mirrors 56, 58 and a relay lens 57 are provided for guiding the observed image.

Branching means 49 which is switched over manually or electrically is provided in the detour light path unit 34, and it is configured to be able to select a through state or a reflection state as shown in FIG. 1 and FIG. 2. The branching means 49 is installed on a linear movement mechanism such as a linear guide and so forth, and reproduction of a reflection angle can be acquired when inserted into a light path. Further, relay lenses 50, 52, 54 and reflection mirrors 51, 53 are provided, respectively, in the detour light path unit 34.

There is provided a light switching part 59 which is switched over manually or electronically in the confocal scanner unit 33 and which is configured to be able to switch over a light path as shown in FIG. 1. A state where light path is switched over is shown by a solid line and a broken line. Still further, an observation camera (acquiring camera) 61 is connected to the confocal scanner unit 33 via a connection tube 60. A barrier filter 62 and a relay lens 63 are provided in the connection tube 60.

Described next is a case for acquiring a confocal image with the configuration of the confocal microscope system of the embodiment.

The light from the laser light source 35 is illuminated from the fiber connector 37 through the optical fiber 36. The laser light becomes substantially a Gausian beam which expands from the tip end of the optical fiber 36 by the numerical aperture of the optical fiber 36. The laser light is converted so as to have substantially a flat intensity distribution when it passes through the uniform optical system 38.

Further, the converted light is introduced into the introduction optical system 39 where it is reflected by the mirror 40, and unnecessary wavelength components are eliminated by the excitation light filter 41, then converted into a parallel light by the collimate lens 42 which is subsequently reflected by the mirror 43. This light is reflected by the mirror 44 of the confocal scanner unit 33, and is guided to the microlens array disc 45.

The light passed through the microlens of the microlens array disc 45 is transmitted through the dichroic mirror 55 and condensed so as to pass through the corresponding pin holes of the pin hole array disc 46.

Figure 4:
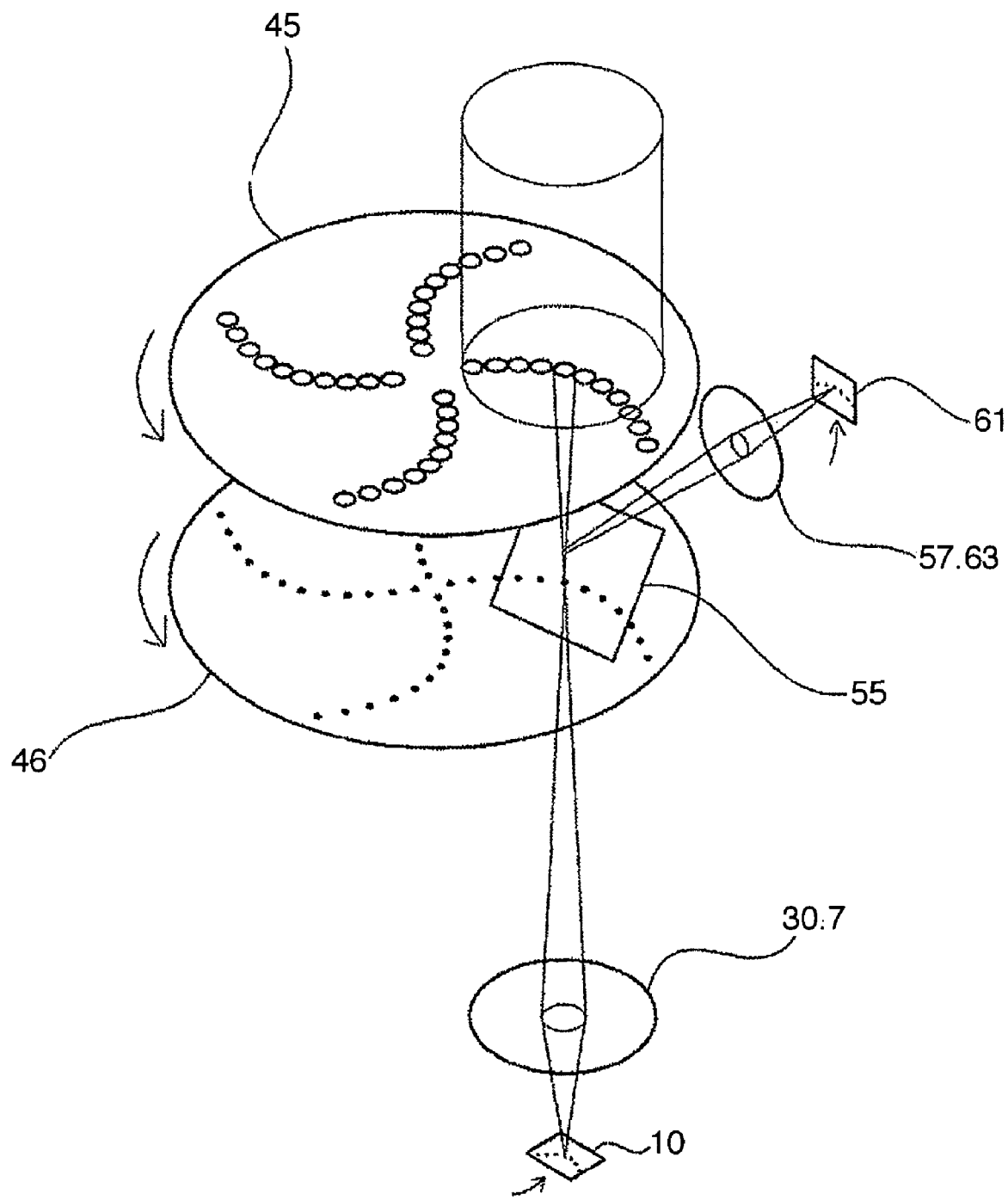
FIG. 4 is a view for typically explaining an operation of a confocal scanner unit in the confocal microscope system in FIG. 1.

An operation of these components is typically illustrated in FIG. 4. In FIG. 4, mirrors and so forth are omitted and lenses are represented in a lump. When acquiring the confocal image, the branching means 49 selects the through state, and the light emitted from the pin holes passes through the branching means 49, which is subsequently converted into a parallel light by the tube lens 3a inside the port part 3, then it is reflected by the selected mirror 12 by which the total refection state is selected, and condensed on the observation sample 10 by the objective lens 7.

The fluorescent image from the observation sample 10 is returned to the same light path, and passes again through individual pin holes, which is subsequently reflected by the dichroic mirror 55 for reflecting the fluorescent light, then reflected by the mirrors 56, 58. The light switching part 59 selects the state of light path shown by the broken line in FIG. 1 when acquiring the confocal image, while necessary fluorescent light components alone are filtered from the fluorescent light by the barrier filter 62, which is subsequently guided to the observation camera 61. Further, the fluorescent light is imaged on the imaging elements of the observation camera 61 by one set of relay lenses 57, 63.

Further, when the microlens array disc 45 and the pin hole array disc 46 are rotated at high speed as shown in FIG. 4, the individual focuses on the focal plane of the observation sample 10 and executes scanning of the sample, whereby the fluorescent light from the focal plane of the observation sample 10 also executes scanning of the imaging elements. Meanwhile, the light other than that on the focal plane can not pass through the same light path, and hardly passes through the pin holes. As a result, the fluorescent image (confocal image) from the focal plane is acquired by the imaging camera 61.

Described next is the case for acquiring the bright field image.

After the light from the observation light source 4 is reflected by the mirror 16, it illuminates the observation sample 10 via the condenser lens 6 while the bright field image from the observation sample 10 is reflected by the mirror part 12 by which the total reflection mirror is selected, and directed to the port part 3. After the light passed through the tube lens 3a of the port part 3, it is branched by the branching means 49 by which the total reflection state is selected so as to pass through the detour light path unit 34.

In this case, since the state of light path as shown by the solid line is selected by the light switching part 59, the light branched by the branching means 49 is reflected by the mirrors 51, 53 and the light switching part 59, which is subsequently guided to the imaging camera 61. When acquiring the bright field image, the barrier filter 62 is removed. The image from the tube lens 3a is imaged on the imaging elements of the imaging camera 61 by two sets of relay lenses 50, 52 and 54, 63. A set of relay lenses 50, 52 are configured to enlarge the optical path in the detour light path unit 34.

When acquiring the fluorescence image, the mirror parts 12, 13 select the dichroic mirror, respectively. In this case, the light from the excitation light source 5 is reflected by the mirror 17 and transmitted through the dichroic mirrors of the mirror parts 12, 13, thereafter illuminates the observation sample 10 via the objective lens 7. Although the fluorescent light emitted from the observation sample 10 is returned to the same light path, when it is reflected by the dichroic mirror of the mirror part 12, it is directed to the port part 3. After the light passes through the tube lens 3a of the port part 3, the light is branched by the branching means 49 by which the total reflection state is selected so as to pass through the detour light path unit 34.

In this case, since the state of light path as shown by the solid line is selected by the light switching part 59, the light branched by the branching means 49 is reflected by the mirror 51, the mirror 53 and the light switching part 59, then it is guided to the imaging camera 61. When acquiring the fluorescent image, the barrier filter 62 which transmits only the fluorescent light to be desirably acquired is inserted into the connection tube 60. The image from the tube lens 3a is imaged on the imaging elements of the imaging camera 61 by two sets of relay lenses 50, 52 and 54, 63. One set of relay lenses 50, 52 are configured to enlarge the optical path in the detour light path unit 34.

Comparing the confocal image as acquired with the fluorescent image and the bright field image as acquired, the latter uses relay lenses more than the former by one set, so that the images of the latter become those acquired by turning them 180 degrees relative to the former. A roof prism or a Schmidt prism and so forth may be inserted in midway of the light path in order to correct the images. Further, it may be sufficient to prepare a rotary image by electronically rotating the acquired image.

Figure 5:
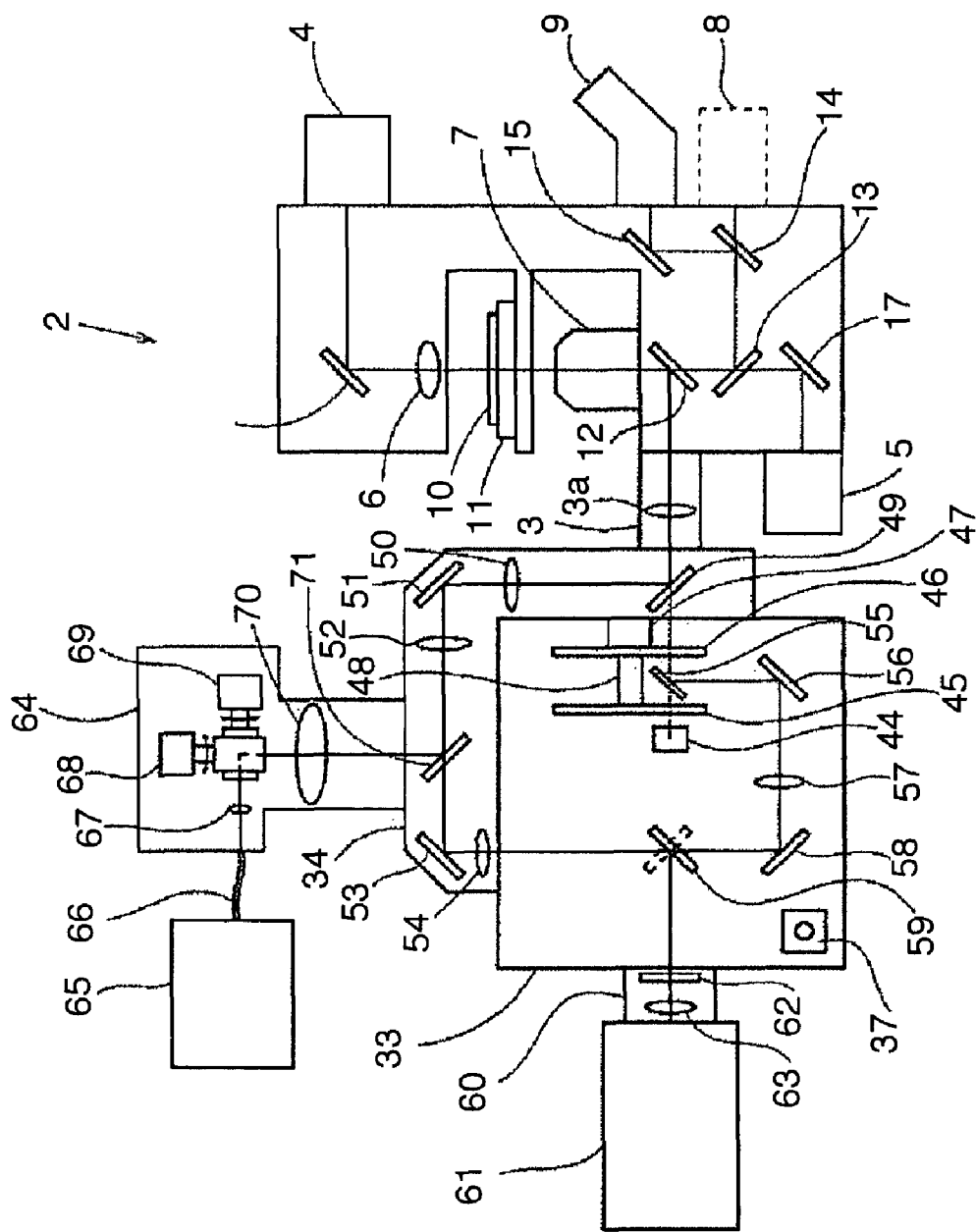
FIG. 5 is a view showing a configuration of another embodiment of a confocal microscope system according to the invention.

FIG. 5 is a view showing a configuration of another embodiment of a confocal microscope system according to the invention. In the same figure, the components which are the same as those in FIG. 1 are denoted by the same reference numerals. In the example shown in the same figure, a detachable laser light introduction unit 64 and laser light superposition means 71 are attached to the detour light path unit 34 in FIG. 1 in the midway thereof. The light from a laser light source 65 is introduced into the laser light introduction unit 64 via an optical fiber 66. A collimate lens 67, galvano mirrors 68, 69 for scanning the light, and an F θ lens 70 are provided in the laser light introduction unit 64. Provided in the detour light path unit 34 is laser light superposition means (mirror) 71 which is freely insertable in the detour light path unit 34. The laser light superposition means 71 is installed on a linear movement mechanism such as a linear guide and so forth so as to obtain a reproduction of an reflection angle when inserted into the light path. A half mirror or a dichroic mirror is mounted on a branching means 49.

With the confocal microscope system having the foregoing configuration, the laser light is introduced via the laser light introduction unit 64 while observing the confocal image in the method described as above. The laser light from the laser light source 65 is introduced into the laser light introduction unit 64 via the optical fiber 66. The laser light is converted into a parallel light by the collimate lens 67, which is subsequently freely scanned by two galvano mirrors 68, 69, thereafter it is imaged on an imaging position of a relay lens 52 by the F θ lens 70.

This light is guided to a port part 3 of the microscope by the relay lenses 52, 50, a mirror 51 and a half mirror or dichroic mirror of the branching means 49. The light imaged by the F θ lens 70 is relayed to an imaging position of the tube lens 3a by the relay lenses 52, 50, to be subsequently converted into a parallel light. The parallel light passes through the light path which is the same as that of the laser light of the confocal image, and is focused on the observation sample 10 via the objective lens 7.

When the light is illuminated on the observation sample 10 at the desired position by two galvano mirrors 68, 69, fluorescence photobleaching is caused to occur in the observation sample 10 so that the recovery of the fluorescent light thus photobleached can be observed by the confocal image (FRAP method).

Since the photobleaching and confocal observation can be executed by one port of the microscope, which is convenient. The light path of the detour light path unit can be effectively utilized for the purpose other than the method of use as illustrated in FIG. 1.

Figure 6:
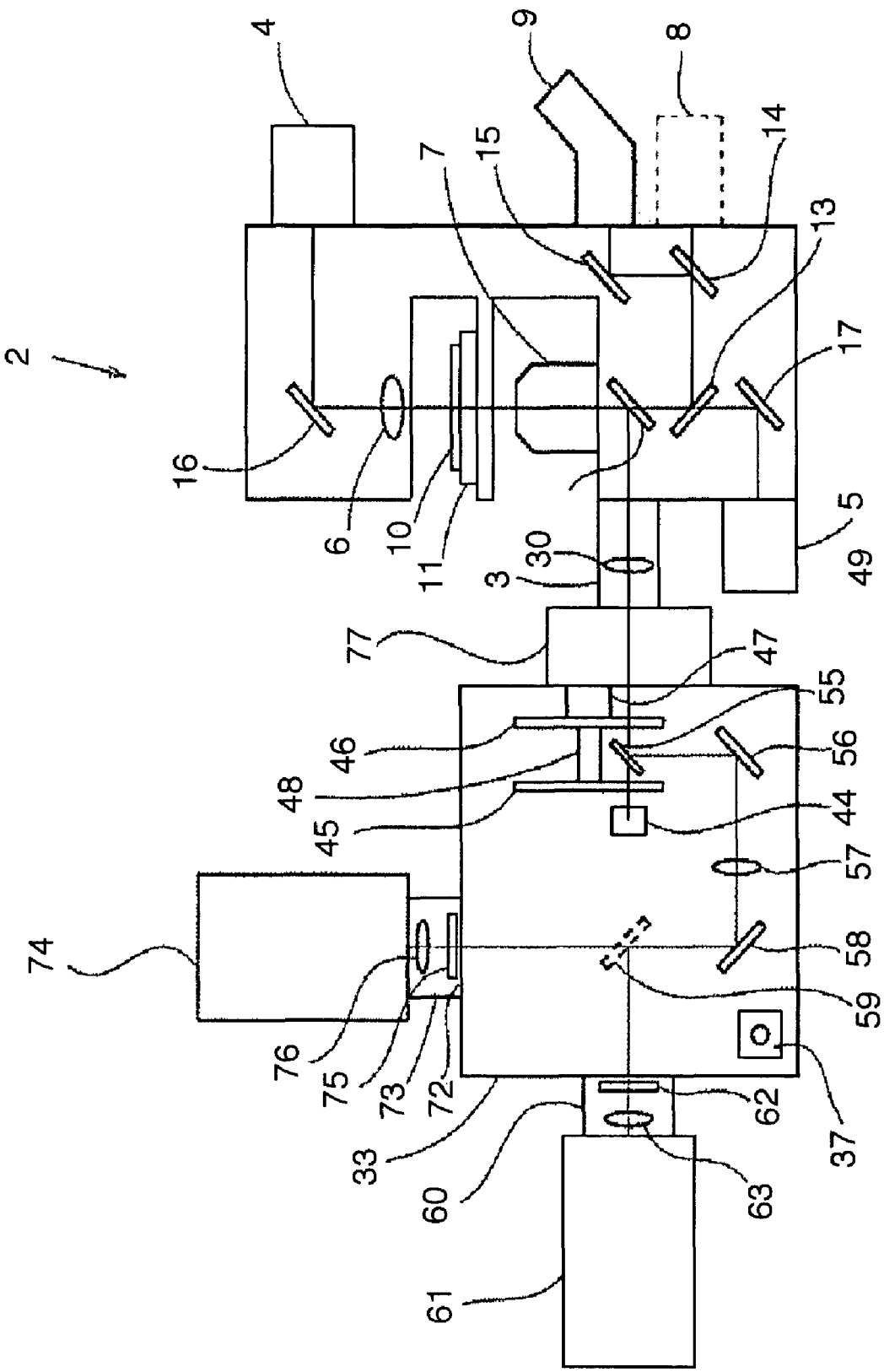
FIG. 6 is a view showing a configuration of still another embodiment of a confocal microscope system according to the invention.

FIG. 6 is a view showing a configuration of still another embodiment of a confocal microscope system according to the invention. In the same figure, the components which are the same as those in FIG. 1 are denoted by the same reference numerals. An example shown in the same figure is a case where a second imaging camera 74 is attached to a port opening 72 to return a light from the detour light path unit 34 to a confocal scanner unit 33 when the detour light path unit 34 in FIG. 1 is detached from the system.

The second imaging camera 74 is provided in the port opening 72 via a detachable connection tube 73. A barrier filter 75 and a relay lens 76 are provided in the connection tube 73. Further, a dichroic mirror is attached to a light switching part 59 at the portion shown by a broken line. Still further, a spacer 77 is attached to a port part 3 instead of the detour light path unit 34.

In the example shown in FIG. 6, an image is acquired by a first imaging camera 61 with the method of acquiring the confocal image shown in FIG. 1. Further, when observing a fluorescent light having another wavelength of the light from an observation sample 10, the fluorescent light is directed to the second imaging camera 74 by the dichroic mirror of the light switching part 59 having a property to transmit the fluorescent wavelength to be acquired.

The fluorescent light is imaged on imaging elements inside the second imaging camera 74 by the relay lens 76 after necessary fluorescent light components alone are filtered from the fluorescent light by the barrier filter 75. Further, at this point in time, the image of the second imaging camera 74 to be acquired becomes a mirror image of the first imaging camera 61. Accordingly, an image rotation prism (Dove prism, trapezoidal prism) may be inserted in front of the second imaging camera 74. More further, an image signal from the second imaging camera 74 may be electronically inverted. Still more further, an ocular lens may be provided instead of the second imaging camera 74.

Since a light axis of the second imaging camera and that of the detour light path are commonized, the configuration of the confocal microscope system becomes convenient. Further, if the barrier filter 62 is switched over when acquiring the fluorescent images having two wavelengths, the synchronism for every wavelengths is lost, but the fluorescent images can be taken in at the same time by two cameras according to the confocal microscope system of the this embodiment, so that there does not occur a problem of time lag.

According to the confocal microscope systems of the invention described as above, the branching means is provided between the microscope and the confocal scanner unit, and the observation light to be acquired from the observation sample is selectively bypassed in front of the confocal scanner unit, to be incident on the observation mirror tube (imaging camera), so that the bright field image and the fluorescent image can be observed together with the confocal image by the common ocular lens (imaging camera).

Although the embodiments described as above show examples wherein a plurality of mirrors and so forth are laid out in a line as a means for switching the mirrors and the branching means, and they are slid by the linear movement mechanism such as a linear guide and so forth, these switching means are not limited to such a configuration.

What is claimed is:

1. A confocal microscope system, for observing a bright field image, a fluorescent image, a confocal image acquired from an observation sample, comprises:

a confocal scanner unit having at least a microlens array disc and a pin hole array disc, for scanning a face of the observation sample by a plurality of beam spots, and a relay lens connected to a camera for acquiring observed images;

a microscope for holding the observation sample and illuminating an observation light for observing the bright field image and an excitation light for observing the fluorescent image on the observation sample, and having a port part for outputting the observation light acquired from the observation sample to the confocal scanner unit; and a detour light path unit selectively inserted between the port part of the microscope and the confocal scanner unit for branching the observation light from the observation sample and guiding the branched observation light to the relay lens in the confocal scanner unit.

2. The confocal microscope system according to claim 1, wherein the microscope has an observation light source to emit the observation light for observing the bright field image, and an excitation light source to emit the excitation light for observing the fluorescent image, while the confocal scanner unit has a laser light source for observing the confocal image.

3. The confocal microscope system according to claim 1, wherein the relay lens in the confocal scanner unit is connected to a camera for acquiring the observed image.

4. The confocal microscope system according to claim 1, wherein the detour light path unit comprises branching means to be inserted between the port part of the microscope and the confocal scanner unit and configured by a half mirror or a dichroic mirror, and laser superposition means to focus a laser light for observing a discolored fluorescent light on the observation sample in a light path thereof.

5. The confocal microscope system according to claim 4, further comprising a laser light introduction unit for introducing the laser light into the laser superposition means provided with operation means for causing the laser light to scan the observation sample.

* * * * *